United States Patent [19]

Yoshinaka et al.

[11] Patent Number: 4,929,518
[45] Date of Patent: May 29, 1990

[54] SEALED LEAD-ACID STORAGE BATTERY

[75] Inventors: Minoru Yoshinaka, Osaka; Koujirou Matsuo, Chigasaki; Kiichi Koike, Fujisawa; Yoshie Suzuki; Mansaku Sugimoto, both of Chigasaki, all of Japan

[73] Assignee: Matsushita Electric Industrial Co., Ltd., Osaka, Japan

[21] Appl. No.: 138,458

[22] PCT Filed: Mar. 16, 1987

[86] PCT No.: PCT/JP87/00164
§ 371 Date: Nov. 19, 1987
§ 102(e) Date: Nov. 19, 1987

[87] PCT Pub. No.: WO87/05749
PCT Pub. Date: Sep. 24, 1987

[30] Foreign Application Priority Data

Mar. 19, 1986 [JP] Japan ................................. 61-62125
Mar. 20, 1986 [JP] Japan ................................. 61-62222

[51] Int. Cl.⁵ ...................... H01M 2/12; H01M 2/02; H01M 6/04
[52] U.S. Cl. ..................... 429/54; 429/163; 429/178; 429/204
[58] Field of Search ................. 429/204, 163, 178, 54; 220/209

[56] References Cited

U.S. PATENT DOCUMENTS

| | | | |
|---|---|---|---|
| 4,520,085 | 5/1985 | Wyser | 429/178 X |
| 4,556,612 | 12/1985 | Thibault et al. | 429/54 |
| 4,582,767 | 4/1986 | Morioka et al. | 429/163 X |
| 4,636,446 | 1/1987 | Lee | 429/54 |
| 4,662,533 | 5/1987 | Takahashi et al. | 220/209 |

Primary Examiner—Stephen J. Kalafut
Attorney, Agent, or Firm—Lowe, Price, LeBlanc, Becker & Shur

[57] ABSTRACT

A sealed lead-acid storage battery is formed with a casing (1) made of a thermoplastic resin receives a group of electrodes (6) consisting of a positive electrode (2), a negative electrode (3), and a separator (4). A peripheral rim of a metal plate (7) laminated with a thermoplastic resin film or sheet on one surface thereof and serving as a battery casing and a terminal is thermally bonded to the body (1). A polyolefin resin on the surface of an epoxy resin covering protruding portions (5a) of positive and negative electrodes is thermally bonded to both the casing and the resin on one surface of the metal plate so as to hermetically seal the protruding portion (5a).

With this structure it is possible to provide a miniaturized and low-cost sealed lead-acid storage battery having a high volumetric efficiency.

10 Claims, 2 Drawing Sheets

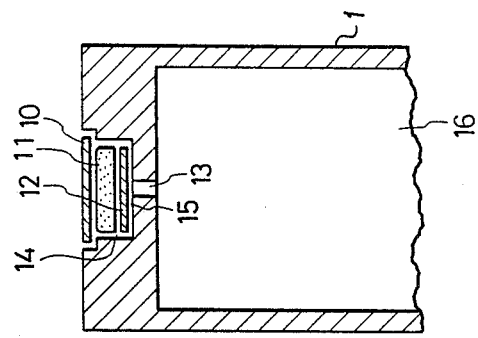
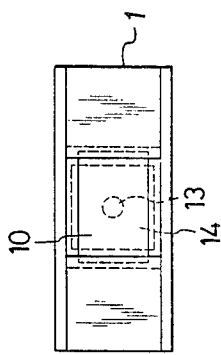
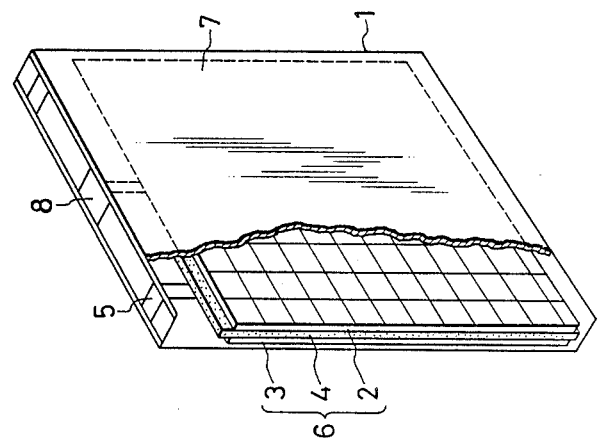

SEALED LEAD-ACID STORAGE BATTERY

FIELD OF TECHNOLOGY

The present invention relates to the improvement of sealed lead-acid storage battery useful as power source for a portable apparatus or the like and provides a lead-acid storage battery, the assembling process of which is simple and is speedily completed, the cost is low, the reliability is high, and the volumetric efficiency is excellent.

BACKGROUND TECHNOLOGY

A conventional sealed lead-acid storage battery is constructed as shown in FIG. 4 which is used as a power source for a portable apparatus or the like. In FIG. 4, is illustrated a casing made of a thermoplastic resin 1 for receiving a group of electrodes 6 composed of a positive electrode 2, negative electrode 3, and separator 4. An opening portion of a casing 1 surrounding the periphery of the group of the electrodes 6 is hermetically sealed when the opening portion is thermally bonded to a periphery of a metal plate 7 for a battery casing, an inner surface of which metal plate has been already laminated with a polyethylene film or the like. Numeral 5 denotes a pole bar portion, and numeral 8 denotes a vent valve formed at the casing 1 and having the function of opening the valve with the increment of the inner pressure of the battery. The method for completely sealing the pole bar portion 5 will be described hereinbelow. One method is that an adhesive such as an epoxy resin is filled and hardened. The other method is that a sheet of lead alloy previously coated with the epoxy resin or a polyethylene resin is welded to a protruding portion of the electrode by TIG welding or the like to form a pole bar, and the resulting pole bar is thermally bonded between the casing and the metal plate for a battery casing.

By the structure described above, it was possible to make a sealed lead-acid storage battery, which is thin, i.e. less than 10 mm, and has a high volumetric efficiency. As shown in FIGS. 5 and 6, the vent valve 8 of this type of sealed lead-acid storage battery is constructed as described hereinbelow. A concave portion 14 having a flat bottom as a valve seat 15 is provided at the center portion of the thick end of the casing 1 forming a battery casing, and a vent port 13 is formed at the center of the vent seat 15. Moreover, a rubber sheet flat valve 12 for sealing the vent port 13 and a cushion member 11 resiliently compressing the rubber sheet flat valve 12 are provided, and there is mounted a cushion pressing plate 10, which holds the top of the rubber sheet flat valve 12 and the top of the cushion member 11 and closes the concave portion 14. The cushion pressing plate 10 is secured to the casing 1 forming the battery casing by ultrasonic bonding.

In such a conventional structure, the hardening of adhesive usually requires approximately one hour at 60° C. because an adhesive such as an epoxy resin or the like is used for sealing of the pole bar portion 5. As a result, it is impossible to improve productivity in the production process. In the method wherein a sheet of lead alloy coated with the epoxy resin or the polyethylene resin is welded to the protruding portion, it was difficult to provide an efficient assembling line for sealed lead-acid storage batteries which can operate at high speeds and low costs, since there is a problem in reliability of the welding and cost.

On the other hand, as to the vent valve 8, there are problems described below in the above-mentioned structure: (1) the cost rises since the number of parts to be used is large, (2) hereafter, there is a tendency for this type of sealed lead-acid storage battery to be miniaturized, and subsequently the parts to be used are miniaturized, so that the operation efficiency becomes worse, (3) the number of operations is large in the process of ultrasonic bonding operation or the installation cost for bonding is high.

DISCLOSURE OF THE INVENTION

The present invention has been developed in view of the above-mentioned drawbacks and provides an improved sealed lead-acid storage battery described hereinbelow. Owing to the fact that a protruding portion of a electrode is coated with an epoxy resin and a polyolefin resin and therefore it is possible to thermally bond the protruding portion with the casing and one surface of the metal plate coated with a polyolefin film or the like, it is possible to make an assembling line for assembling the battery with high-speed efficiency. As a result, a sealed lead-acid storage battery can be made which has a high volumetric efficiency and is of low cost.

According to the present invention, the sealing structure of the pole bar portion is characterized as described below.

First, the protruding portion of each of the electrode is directly coated with the epoxy resin and the polyolefin resin, a group of electrodes is thereafter sandwiched between the casing made of a thermoplastic resin and surrounding the periphery of the group of electrodes and metal plate whose inner surface is laminated with a polyolefin film, and then, upon thermal bonding of the casing and the metal plates, the protruding portions of electrodes are also thermally bonded to them sealing the opening. Instead of the conventional manner, the above-mentioned epoxy resin adhesive is used for adhesion, and a sheet of lead alloy coated with the epoxy resin and the polyolefin resin is welded to the protruding portion of the electrode, and then, the resulting part is thermally bonded to the casing.

Since the process and installation for assembling the battery are simplified and it is possible to greatly shorten the operation time of the opening-sealing process by this structure, the battery can be assembled at a high-speed. As a result, a sealed lead-acid storage battery of low cost, high reliability, and excellent volumetric efficiency can be provided.

As to the vent valve portion, it is easy to assemble the vent valve portion, because the pressing plate compressing the cushion member is fitted into the grooves or the concave and convex portions of the concave portion formed at the casing of the battery.

Preferably, the casing of the battery and the pressing plate of the cushion are formed integrally, the joint portion of the pressing plate is formed such that the thickness of the joint portion is thinner than that of the pressing plate, thereby being easy to bend by the function of the hinge, and the pressing plate fitting portion of the opening of the concave portion is provided with a concave portion and a convex portion. As a result, once the pressing plate is fitted, it is difficult for it to be disengaged.

By this structure, the operation efficiency is largely improved and the products are readily obtained in quality as compared with the conventional method. As a result, hereafter, even if sealed lead-acid storage battery is miniaturized, it is possible to design the structure in accordance with such trend.

BRIEF DESCRIPTION OF THE DRAWINGS

FIG. 4 is a perspective view showing the structure of the conventional sealed lead-acid storage battery;

FIG. 5 is a cross-sectional view of the vent valve portion having a flat valve of the conventional sealed lead-acid storage battery; and FIG. 6 is a top plan view of the vent valve portion having a flat valve described above.

DESCRIPTION OF THE PREFERRED EMBODIMENTS

Figure 1:
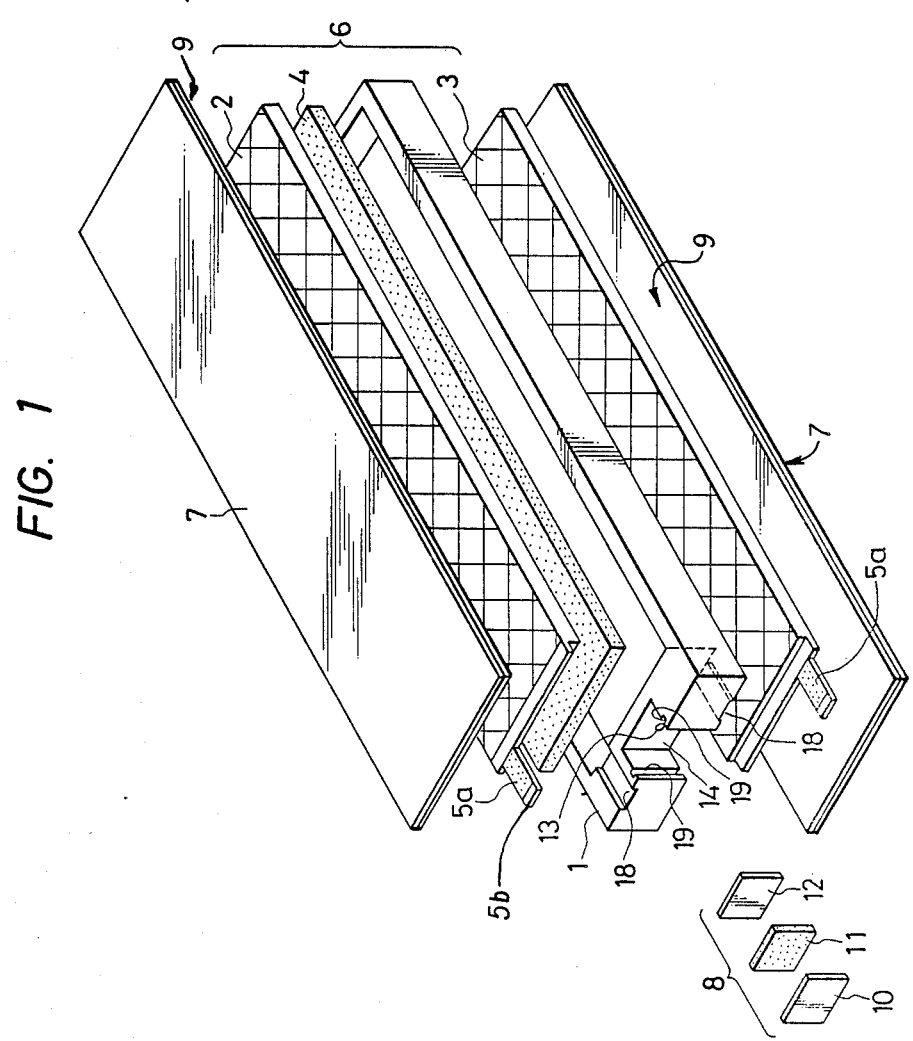
FIG. 1 is a perspective view of the sealed lead-acid storage battery before assembling of the embodiment of the present invention.

The embodiments of the present invention will be described hereinbelow. FIG. 1 shows a sealed lead-acid storage battery of the present invention, wherein numeral 1 denotes a casing made of a polyolefin resin such as a polyethylene resin, which casing surrounds a periphery of a group of electrodes 6. A protruding portion of an electrode 5a is directly coated with an epoxy resin which is superior in heat resistance and adhesive property, the epoxy resin thereafter is hardened, and then the resulting surface is again coated with a modified-polyethylene solution. The group of electrodes 6 comprises a positive electrode 2 and a negative electrode 3 each having a protruding portion coated as described above, and a separator 4 made of nonwoven fabric mainly composed of glass fiber of a diameter of less than 5 μm, which separator 4 is superior in absorbing a power of electrolyte. The group of electrodes 6 is received in the casing 1.

An aluminium plate, a stainless steel plate, or a tinned steel plate is used as a metal plate 1 for the battery casing. A thermally bondable polyethylene or polyester film 9 is bonded, and especially, a thermally bondable film or sheet including one body with three layers consisting of an ethylene acrilic acid (EAA) layer, a polyethylene terephthalate (PET) layer, and another ethylene acrilic acid (EAA) layer, which film or sheet has been improved in acid resistance and strength on thermal bonding, is laminated to one surface of the metal plate by means of adhesion or bonding by fusion. The group of electrodes is sandwiched between two metal plates 7 with the resin film layer of each of the metal plates being opposed to the group of electrodes, and then the rim of the metal plates 7 and the rim of the opening of the casing 1 are thermally bonded each other. Casing 1, is provided in advance with a shallow, slender and long concave portion 18 in which the protruding portion of the electrodes 5a is fitted on thermal bonding, and a vent valve 8 arranged to be opened when the inner pressure of the battery rises above a predetermined value is located on one end of the casing. When the metal plates 7 for the battery casing are thermally bonded to the casing 1, the protruding portions 5a also are thermally bonded to the casing 1 and thermal bonding film on one side of the metal plates 7.

The separator is impregnated with the electrolyte indispensable to the battery in advance before this thermal bonding.

Before thermal bonding, an uncoated edge 5b of the protruding portion of the electrode 5a arranged to be fitted in the concave portion 18 of the casing 1 made of a resin is spot-welded or the like to a film-removed portion of inner edge portion of the metal plate 7 for battery casing to connect each other electrically, so that the metal plate for the battery casing is used as an external terminal.

Figure 2:
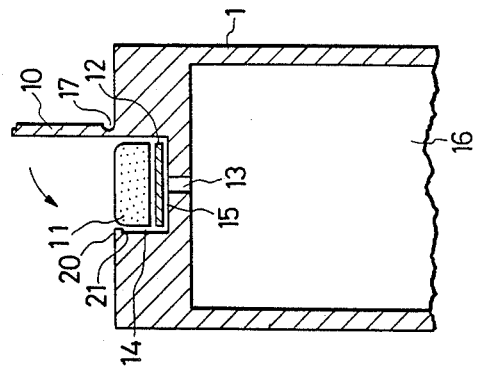
FIG. 2 is a cross-sectional view of the vent valve portion of the sealed lead-acid storage battery of the embodiment of the present invention.
Figure 3:
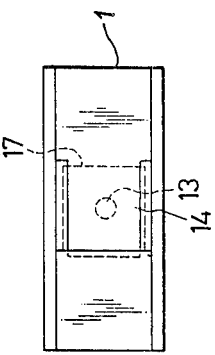
FIG. 3 is a top plan view of the vent valve portion of the sealed lead-acid storage battery of the same embodiment described above.

Referring to FIGS. 2 and 3, the vent valve 8 will be described hereinbelow. In these figures, numeral 9 denotes a battery casing, and numeral 14 denotes a concave portion formed at the center portion of a thick end of the battery casing 9. A flat vent seat 15 is formed at the entire bottom of the concave portion 14. Numeral 13 denotes a vent port provided at the flat vent seat 15 so as to oppose to the center of the upper portion of a lead-acid storage battery chamber 16. Numeral 12 denotes a rubber sheet flat valve placed in contact with the vent seat 15 to hermetically seal the vent port 13. As to the material of the rubber sheet used as the flat valve, a chloroprene rubber is optimal, because opening and shutting of the valve is easily carried out and this rubber has flexibility. Numeral 11 denotes a cushion member which resiliently and uniformly compresses the top of the flat valve 12, and moreover the top of the cushion member 11 is compressed and covered by a pressing plate 10. The cushion member is made of an open-cell foam of ethylene-propylene non-conjugated diene terpolymer (EPDM), and open-cell foam of EPDM is useful for miniaturizing. The pressing plate 10 can be fitted into grooves 19 provided at the inner side of the opening portion of the concave portion 14 shown in FIG. 1. Otherwise, the casing 1 and the pressing plate 10 are formed integrally through the thin joint portion 17 as shown in FIG. 2, and the pressing plate 10 is urged to pass through the convex portion 20 facing the joint portion 17 at the opening portion and can be fitted into a concave portion 21 under the convex portion 20 by means of the function of the thin joint 17 which acts as a hinge.

According to the present invention as described above, the protruding portions 5a of the electrodes of the pole bar portions are directly coated with the epoxy resin in advance, and the surfaces coated with the epoxy resin are coated with the polyolefin resin having the property of thermal bonding. Therefore, the metal plates 7 for the battery casing and the pole bar portions can be thermally bonded to the casing 1 surrounding the periphery of the group of the electrodes in the same instant. As a result, the assembling process is simplified and is completed at a high-speed, and the sealed lead-acid storage battery of low cost, high reliability, and high volumetric efficiency can be made in comparison with the conventional method wherein adhesive is used and the pole bar treated by a resin is welded to the electrode.

POSSIBILITIES OF INDUSTRIAL UTILIZATION

According to the present invention described above, the number of parts to be used for the terminal portion and the vent valve portion decreases thereby reducing cost. Hereafter, the tendency of miniaturization of sealed lead-acid storage battery can be more easily performed.

We claim:

1. A sealed lead-acid storage battery comprising a group of electrodes consisting of a positive electrode, a negative electrode, and a separator sandwiched between two metal plates having a polyolefin resin film or sheet laminated on one surface thereof such that said polyolefin resin layers of said metal plates face said group of electrodes, said group of electrodes is hermetically sealed in a casing made of said polyolefin resin, said casing is thermally bonded to a periphery of said group of electrodes and a peripheral rim of said metal plates, said battery further comprising, a protruding portion of a positive electrode and a negative electrode coated with an epoxy resin and again coated with said polyolefin resin on said epoxy resin layer, said resulting protruding portions are sandwiched between said casing and said metal plates having said polyolefin layer so that said group of electrodes is hermetically sealed and said protruding portions are hermetically sealed between said casing and said resin layer surfaces of metal plates, with an uncoated edge of said protruding portions in direct contact with a film-removed portion of an adjacent metal plate.

2. A sealed lead-acid storage battery as claimed in claim 1, wherein said separator is mainly composed of glass fibers having a diameter of less than 5 $\mu$m.

3. A sealed lead-acid storage battery as claimed in claim 1, wherein said polyolefin resin film or sheet provided on one surface of said metal plates includes one body with three layers consisting of an ethylene acrylic acid layer, a polyethylene terephthalate layer, and another ethylene acrylic acid layer.

4. A sealed lead-acid storage battery as claimed in claim 1, wherein said metal plates laminated with said film or sheet made of said polyolefin resin on one surface of said metal plates is a tinned steel plate.

5. A sealed lead-acid storage battery as claimed in claim 1, wherein said protruding portions of said electrodes are welded to periphery rim portions of one surface of an adjacent metal plate so that said metal plates are useful as external terminals.

6. A sealed lead-acid storage battery as claimed in claim 1, wherein concave portions for receiving said protruding portions of said electrodes are formed in said casing to be sandwiched between said metal plates and to be thermally bonded.

7. A sealed lead-acid storage battery comprising a group of electrodes consisting of a positive electrode, a negative electrode, and a separator sandwiched between two metal plates having a resin film or sheet laminated on one surface thereof such that said resin layers of said metal plates face said group of electrodes, said group of electrodes is hermetically sealed in a casing made of a thermoplastic resin, said casing is thermally bonded to a periphery of said group of electrodes and a peripheral rim of said metal plate in such a manner that an uncoated edge of protruding portions of said positive and negative electrodes are in direct contact with a film-removed portion of an adjacent metal plate, said battery further comprising a pressing plate fitted in grooves of a concave and a convex portions of said casing provided in the vicinity of an opening portion of said concave portion, said concave portion having a flat upper surface, and a vent port in a bottom portion thereof which extends through one end of said casing, a rubber sheet flat valve is located at said bottom portion for sealing said vent port, and a cushion member is provided between said rubber sheet flat valve and said pressing plate for uniformly and resiliently compressing said rubber sheet flat valve in said concave portion, said cushion member being made of a synthetic resin foam.

8. A sealed lead-acid storage battery as claimed in claim 7, wherein said rubber sheet flat valve is made of a chloroprene rubber.

9. A sealed lead-acid storage battery as claimed in claim 7, wherein said cushion member is made of an open-cell foam of ethylene-propylene non-conjugated diene terpolymer.

10. A sealed lead-acid storage battery as claimed in claim 7, wherein one side of said pressing pate is connected to said casing through a thin joint portion such that said pressing plate and said casing are formed integrally.

* * * * *